United States Patent [19]
Klein

[11] Patent Number: 4,783,100
[45] Date of Patent: Nov. 8, 1988

[54] SWIVEL JOINT

[75] Inventor: Donald J. Klein, Downey, Calif.

[73] Assignee: Philips Industries, Inc., Anaheim, Calif.

[21] Appl. No.: 40,497

[22] Filed: Apr. 20, 1987

[51] Int. Cl.$^4$ ............................................. F16L 27/08
[52] U.S. Cl. .................................... 285/276; 285/321
[58] Field of Search .............................. 285/321, 276

[56] References Cited

U.S. PATENT DOCUMENTS

| | | | |
|---|---|---|---|
| 2,125,677 | 8/1938 | Kuchenmeister | 285/321 X |
| 2,468,315 | 4/1949 | Wagner | 285/276 X |
| 2,944,840 | 7/1960 | Wiltse | 285/321 X |
| 3,479,068 | 11/1969 | Brittain | 285/321 |
| 3,637,239 | 1/1972 | Daniel | 285/321 X |
| 4,133,564 | 1/1979 | Sarson et al. | 285/321 |
| 4,186,946 | 2/1980 | Snow | 285/276 X |
| 4,240,654 | 12/1980 | Gladieux | 285/276 |
| 4,565,392 | 1/1986 | Vyse | 285/321 X |
| 4,580,816 | 4/1986 | Campbell et al. | 285/321 |

FOREIGN PATENT DOCUMENTS

| | | | |
|---|---|---|---|
| 246148 | 12/1962 | Australia | 285/321 |
| 1313637 | 11/1962 | France | 285/321 |
| 292035 | 6/1928 | United Kingdom | 285/321 |
| 910578 | 11/1962 | United Kingdom | 285/321 |
| 932002 | 7/1963 | United Kingdom | 285/321 |

Primary Examiner—Thomas F. Callaghan
Attorney, Agent, or Firm—Lyon & Lyon

[57] ABSTRACT

A swivel joint assembly for plumbing systems includes a first fitting having a receptacle end and a second fitting having a plug end positionable in the receptacle end. The plug end and receptacle end having cooperating mating surfaces, one of which has a locking groove divided into first and second portions, the more distal of which is shallower than the other. The other surface has a groove to receive a locking ring also positioned in the locking groove. A barrel end of the plug receives a seal member to seal against the inner surface of the receptical end.

3 Claims, 1 Drawing Sheet

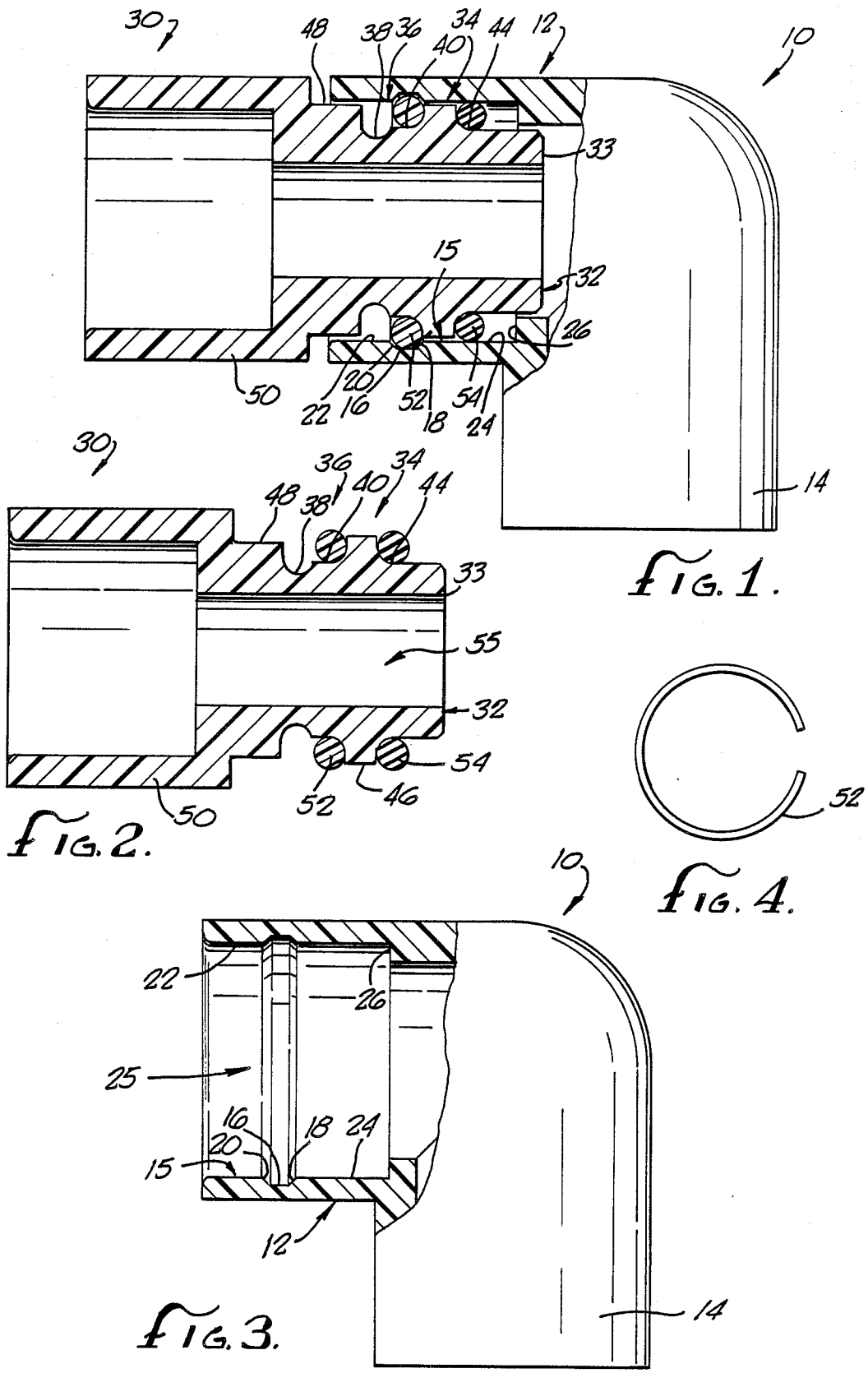

4,783,100

SWIVEL JOINT

BACKGROUND OF THE INVENTION

The field of the present invention is swivel joint plumbing assemblies.

In plumbing systems, it is frequently necessary or convenient for a section of pipe to be able to swivel with respect to an adjoining section, especially when the two pipe sections are joined through an elbow fitting or angular joint. For example, in underground lawn sprinkler plumbing systems, a sprinkler head is connected to an underground pipe through a sprinkler riser pipe. However, the permanent position of the sprinkler head generally cannot be determined until after the final grade level has been established. Although a fixed joint may be used to connect a sprinkler head to an underground pipe, it an provide no adjusting movement for positioning the sprinkler head during final grading. This can result in an out of position sprinkler head, or undue stress on the sprinkler riser and the joints, if the sprinkler head is forced into position, or if it is displaced by vehicle or foot traffic.

Although several swivel joints have been known in the past, they generally have one or more disadvantages, including complex design and high cost, insufficient reliability in preventing leaks, difficult and time consuming assembly, corrosion and degradation problems, etc.

SUMMARY OF THE INVENTION

The present invention is directed to a swivel joint for plumbing systems. More particularly, the invention is directed to relatively simple and inexpensive components which provide a permanent and reliable swivel joint between two sections of pipe in a plumbing system. In addition, many of the disadvantages previously associated with swivel joints are overcome. To this end, the plug end of a first fitting may be positioned in the receptacle end of a second fitting. A split locking ring cooperates with grooves in the circumferential mating surfaces thereof to be locked in place. In a further aspect of the present invention, a seal may be provided to form a pressure tight joint.

Accordingly, it is an object of the present invention to provide a swivel joint for joining two pipe sections in a plumbing system. Other and further objects and advantages will appear hereinafter.

BRIEF DESCRIPTION OF THE DRAWINGS

In the drawings wherein similar reference characters denote similar elements throughout the several views:

FIG. 1 is a side elevational view in part section of the novel swivel joint of the invention in the assembled condition;

FIG. 2 is a cross-sectional view of the second fitting having a plug end;

FIG. 3 is a cross-sectional view of the first fitting having a receptacle end.

FIG. 4 is a plan view of the locking ring.

DETAILED DESCRIPTION OF THE PREFERRED EMBODIMENT

Turning now in detail to the drawings, FIG. 1 illustrates an assembled swivel joint including a first fitting 10 having a receptacle end 12 and another end 14 which may be identical to the first end 12 or a conventional straight end, as may be required. The receptacle end 12 has an internal mating surface 15 including an entry bore 22, an inner bore 24, and a circumferential receiving groove 16. A second fitting 30 has a plug end 32, an external mating surface 15, an end surface 33, and a straight end 50. The plug end 32 is positioned in the receptacle end 12, and is rotatably mounted therein.

As shown in FIG. 2, the second fitting 30 includes a straight end 50 for attachment to a pipe section via e.g., a cemented joint, etc. The straight end 50 leads into a hub 48 which adjoins a circumferential locking groove 36. The locking groove 36 has a first portion 38 and a second portion 40, the first portion 38 being deeper and further from the distal end or end surface 33 than the second portion. The second portion 40 extends from the first portion 38 to a shoulder 46 which has a diameter substantially equivalent to that of the hub 48. A straight barrel 44 extends from the second shoulder 46 to the distal end or end surface 33 at a diameter less than the shoulder 46.

A compressible locking ring 52, illustrated in plan in FIG. 4, is positioned in the locking groove 36. A seal, for example a rubber O-ring 54, is provided on the barrel 44 in against the shoulder 46. The O-ring 54 can be installed onto the plug end 32 by radially stretching it so that it can be passed onto the barrel 44 and positioned against the shoulder 46. Similarly, the locking ring 52, which may be a split lock ring, can be installed onto the plug end 32 by expanding it until the ends of the ring are sufficiently spaced apart to pass over to the reduced diameter at the deeper first portion 38 of the locking groove 36. The compressible locking ring 52 is compressible in its ring diameter by being split. Preferably, the cross section of the element defining the ring 52 is not compressible so that it will form a locking element.

As illustrated in FIG. 3, the first fitting 10 may be straight or in the form of an elbow having ends oriented at 90 degrees with respect to each other, or at any other desired angle. The first fitting 10 may include, two receptacle ends for receiving plug ends 32 of second fittings or one receptacle end and a straight end having, e.g., a smooth socket for cementing a PVC pipe section. As also illustrated in FIG. 33, the receptacle end 12 of the first fitting 10 has an internal mating surface 15 including an entry bore 22, an inner bore 24, and a circumferential receiving groove 16, which may include angled side groove surfaces 18 and 20. The inner bore 24 terminates against a terminal shoulder 26. The barrel 44 of the plug end 32 extends up to or beyond the shoulder 26 with the plug end 32 positioned in the receptacle end 12. As the O-ring 54 extends outwardly to fit against the internal mating surface 15, it cannot slide off the end of the barrel 44 because of the shoulder 26. Thus, once the joint is assembled, the O-ring 54 cannot move out of position on the barrel 44.

The first fitting 10, as well as the second fitting 30 and the locking ring 52 may be molded of plastic using conventional tooling, without any post molding machining.

In use e.g., in an underground lawn sprinkler system, the pipe sections to be pivotally joined together are attached to the swivel joint of the invention. One pipe is joined to the straight end 50 of the second fitting 30, and the other pipe is joined to a fitting attaching to the main pipe line or a fitting attaching to the sprinkler head, using screw threads or other pipe joining techniques. The locking ring 52 and the 0-ring 54 are pre-installed on the second fitting 30 during factory manufacture of the joint, in order to minimize handling of parts and the risk of part misplacement during field installation. The pipe sections to be joined are then positioned so that the leading end surface 33 of the plug end 32 is positioned into the entry bore 22 of the receptacle end 12. The plug end 32 is then pushed into the receptacle end 12 until the locking ring 52 engages the circumferential locking groove 16 to form a pivotal, permanent joint assembly which cannot be readily disassembled.

As the plug end 32 is slidably inserted into the receptacle end 12, the O-ring 54 is deformed within the recess 44. Then as the engagement of the plug end 32 and the receptable end 12 continues, the O-ring 54 passes through the groove 16 and into the inner bore 24 wherein it provides a seal against the tubular surface of the bore 24 and/or the lip 26.

Simultaneously, the locking ring 52 positioned in the first portion 38 of the receiving groove 36 is moved against the receptacle end 12 where it is compressed radially. The locking ring 52 then enters and slides through the entry bore 22 into the groove 16 where it can expand into the groove and assume its uncompressed condition, thereby completing the assembly of the swivel joint. The plug end 32 extends into the bore of the first fitting 10 a sufficient distance with minimum clearance to provide axial bearing support to minimize angular deflection between fittings 10 and 30.

Once the locking ring 52 expands into the groove 16, the joint is permanently assembled and cannot be easily disassembled. If an attempt is made to disassemble or separate the joint, i.e. by pulling the plug end 32 out of the receptacle end 12, the second portion 40 of the locking groove 36 radially engages the locking ring 52 so as to provide an annular I.D. shoulder to support the ring 52, preventing it from compressing and preventing separation of the first fitting 10 and the second fitting 30. When the joint is in its fully engaged position, the O-ring 54 abuts against the lip 26, and also the inner bore 24, the locking ring 52 is positioned in the first portion 38 of the locking groove 36, and the hub 48 is positioned within the entry bore 22. If a separating force is exerted on the joint, the plug end 32 will be slightly withdrawn from the receptacle end 12, until the withdrawing movement is stopped by the second portion 40 of the locking grove 36 engaging the ring 52. However, the sealing effectiveness of the joint is not affected by this movement as the O-ring 54 constantly maintains a seal against the inner bore 24. While the O-ring 54 provides a continuous seal and the locking ring 52 prevents disassembly, the joined first and second fittings may be rotated or swivelled with respect to each other. When swivelling takes place, the -ring and locking ring slide against the mating surfaces of the receptable end and/or the plug end.

The swivel joint of the invention is capable of total sustained system pressures of 150 psi without leaking. In addition, assembly of the joint during field installation is a simple operation requiring no tools or preparation. Moreover, the swivel joint cannot be over torqued as the joint itself utilizes a lock ring for permanent assembly and an O-ring to provide a seal, and no screw threads are involved.

Due to its compact size and simple assembly, the joint can also be used in confined spaces. Furthermore, the first and second fittings require no special equipment or techniques for factory assembly.

Thus, a swivel joint is disclosed which provides a permanent and reliable swivelable joint seal for plumbing systems. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A swivel plumbing joint comprising a first fitting having a receptacle end;
   a second fitting having a plug end positionable in said receptable end to be rotatably mounted therein, said receptacle end having an internal mating surface and said plug end having an external mating surface;
   one of said mating surfaces having a circumferential locking groove including first and second portions, said first portion having a semicircular inner section and being deeper and further from the distal end of said surface than said second portion, the other of said mating surfaces having a circumferential receiving groove adjacent said locking groove with said plug end mounted in said receptacle end;
   a locking ring circular in cross-section positioned in said locking groove and engageable with said circumferential receiving groove with said plug end mounted in said receptacle end, said receiving groove having a width approximately equal to the width of said locking ring.
   a shoulder surface on said plug end disposed between said circumferential locking groove and the distal end of said second fitting;
   a reduced diameter barrel on said plug end extending from said shoulder thereby forming a seal recess therebetween, said receptacle having a terminal shoulder extending inwardly at the internal end of said internal mating surface to bound said seal recess; and
   an O-ring seal member in said seal recess and in the assembled position being spaced from said terminal shoulder and in engagement with said shoulder surface.

2. The swivel plumbing joint of claim 1 wherein said second portion is sized to prevent a change in diameter of said locking ring and disengagement thereof from said receiving groove, with said plug end mounted in said receptacle end.

3. The swivel plumbing joint of claim 1 wherein said locking ring is a split ring of substantially incompressible cross section.

* * * * *